Oct. 30, 1934.  R. I. MOSES  1,978,686
FLUID PRESSURE OPERATED BLOWER FOR CLEANING THE TUBES
OF STEAM GENERATORS AND THE LIKE
Filed May 18, 1932
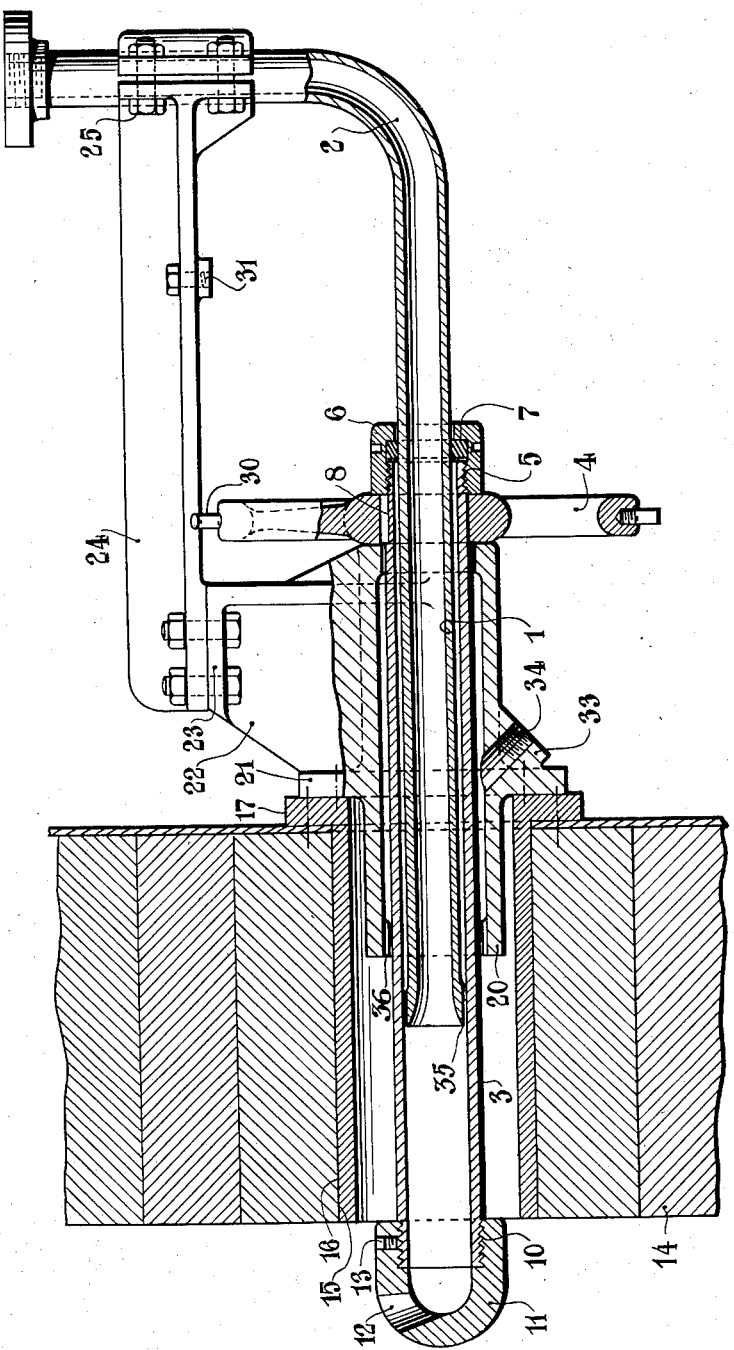
INVENTOR
RICHARD IVOR MOSES,
BY
ATTORNEYS

UNITED STATES PATENT OFFICE 1,978,686

FLUID PRESSURE OPERATED BLOWER FOR CLEANING THE TUBES OF STEAM GENERATORS AND THE LIKE

Richard Ivor Moses, Langley, England, assignor to Ivor Power Specialty Company, Limited, London, England Application May 18, 1932, Serial No. 612,040
In Great Britain May 30, 1931

1 Claim. (Cl. 122—392)

My invention relates to fluid pressure operated blowers for cleaning the tubes of steam generators and the like, and has for its principal object to provide an improved device of this kind which shall be strong, simple in construction, and highly efficient in use.

Further objects of the invention are to provide a construction involving a minimum of machining in the parts, and one wherein any tendency of leakage when in use and consequent erosion of the parts is avoided.

Other features of the invention will be apparent from the following description.

The accompanying drawing shows a side elevation partly sectional of a preferred form of apparatus constructed in accordance with this invention.

Referring now to the drawing, the apparatus comprises a fixed conduit 1 for the passage of steam or other pressure medium, the said conduit being preferably formed of a weldless steel tube, the discharge end being flared outwards whereby its outer surface forms an annular packing collar 35, and the opposite end being preferably formed with a bend 2 and continued at right angles or otherwise to the main portion. The blower tube 3 is mounted concentric with the fixed conduit 1, being capable of longitudinal sliding movement and also of rotary movement thereon by means as will hereinafter appear.

The outer end of the blower tube is of reduced external diameter to provide a shoulder against which is fixedly mounted a hand wheel 4. The projecting outer end of the blower tube 3 is screwed externally at 5 to take a gland nut 6. An annular packing ring 7 is associated with the gland nut 6 to form a guide for the blower tube 3 to slide on the conduit 1, the arrangement being such that the inner cylindrical surface of the packing ring 7 and the outer cylindrical surface of the flare 35 form the bearing surfaces between the two concentric tubular members 1 and 3.

The opposite end of the blower tube 3 is screwed externally at 10 to take the nozzle 11 having an orifice 12 therein. This nozzle 11 can be made of mild steel, cast iron, or nickel chrome steel when exposed to very high temperatures. The nozzle is preferably removable and the aperture 12 is flared outwardly and positioned at an angle to the axis of the tube 3. A set screw 13 is employed to prevent relative rotation between the nozzle 11 and the blower tube 3. The orifice 12 is of greater cross-sectional area than the area of the conduit 2 in order to prevent back pressure and any consequent tendency of steam or other pressure medium blowing out through the gland nut 6.

The wall or boiler setting 14 is apertured at 15, and fitted with a wall box 16, the outer end of which is flanged at 17 whereby it may be secured to the outer surface of the wall by bolts or other suitable means.

The blower tube 3 is slidably mounted within a fixed concentric sleeve 20 formed with a flange 21 whereby it may be bolted or otherwise secured to the flange 17 of the wall box.

This cylindrical sleeve 20 is formed with a web 22, the outer flanged surface 23 of which is adapted to rigidly support a longitudinally extending bracket 24, the outer end of which is so formed as to receive and fixedly support the outer end of the fluid pressure conduit 2, a clamping plate 25 being provided for this purpose. The outer extremity of the conduit 2 is provided with a screwed or welded flange to receive a valve (not shown) which controls the admission of steam or other pressure medium to the said conduit.

Both the longitudinal and rotary movement of the blower tube 3 is effected by the manual operation of the hand wheel 4 keyed to the blower tube. The forward projecting movement of the blower tube is limited by the boss of the hand wheel 4 abutting against the outer annular face of the cylindrical sleeve 20, while the rearward or retracting movement is limited by the hand wheel 4 abutting against a stop secured to the bracket 24 at 31, or by other suitable means. The pins 30 on the hand wheel 4 act to limit the rotary movement of the blower tube and nozzle.

The fixed concentric sleeve 20 is provided with one or more bosses 33 which is/are bored and screwed internally at 34 to take a pipe or pipes admitting a cooling medium an annular space between the blower tube 3 and the said sleeve, which cooling medium passes between bearing fins 36 on the inner end of sleeve 20 to cool the nozzle 11 and the wall box 16.

The hand wheel 4 may be replaced by a sprocket wheel and chain whereby the parts may be manually operated when the device is in an otherwise inaccessible position.

By constructing my improved blower in this way, I provide an extremely simple construction and one that is highly efficient in operation. Leakage of the pressure medium by way of the bearing surfaces is avoided owing to the inductive effect of the steam or other pressure medium admitted to the nozzle, by reason that the outlet 12 for the fluid pressure medium is of greater cross-sectional area than the conduit 2.

While the conduit 1 has been shown concentric with the blower tube 3, it will of course be understood that they may be in eccentric relation to each other should such a construction be desirable.

I wish it to be understood that the invention is capable of adaptation to existing types of blowers, as the central fluid pressure tube and its guiding collar or collars may be readily fitted to the axial bore of an existing blower, the pressure medium being admitted to the central conduit in this manner previously described, other fluid pressure inlets having previously been blanked off.

What I claim and desire to secure by Letters Patent is:—

A fluid pressure operated blower for cleaning the tubes of steam generators and like arrangements and comprising in combination, a conduit for the passage of pressure medium positioned in fixed relation to the steam generator and having a straight portion disposed axially of the blower, a blower tube adapted for longitudinal sliding movement and also rotary movement on the fixed conduit, a sleeve external to the blower tube and adapted to be secured in position within a wall box and of such a size as to define an annular space between the said sleeve and the said blower tube, a boss on said sleeve, a passage in said boss adapted to admit cooling medium to the said annular space, a nozzle mounted at one extremity of the said blower tube, the total cross sectional area of the nozzle outlet being greater than the cross sectional area of the fixed pressure fluid conduit so as to enable the pressure medium to create an inductive effect during its passage through the apparatus, thereby preventing back pressure and any consequent tendency of the pressure medium to leak outwardly around the movable portion of the blower.

RICHARD IVOR MOSES.